(No Model.) 2 Sheets—Sheet 1.
D. W. FALL, F. B. WINELAND & S. L. RICHARDS.
SETTLING TANK.
No. 526,565. Patented Sept. 25, 1894.
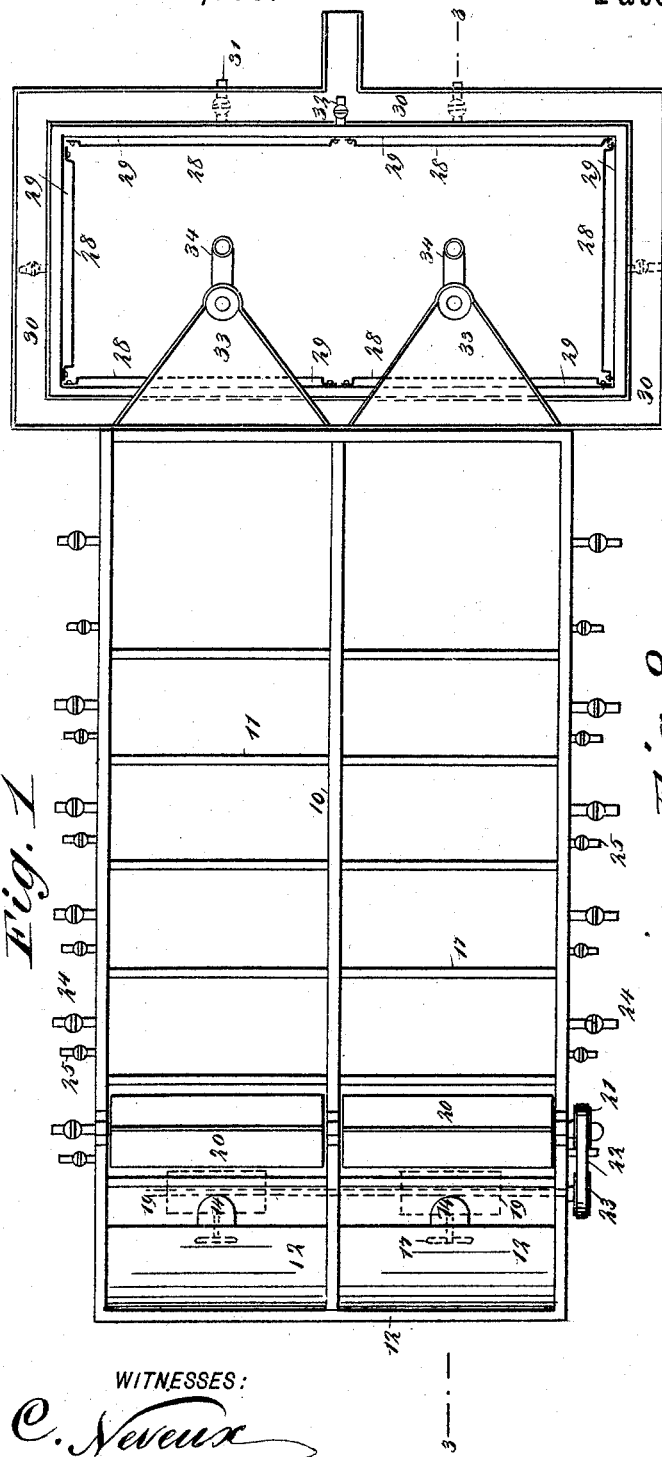
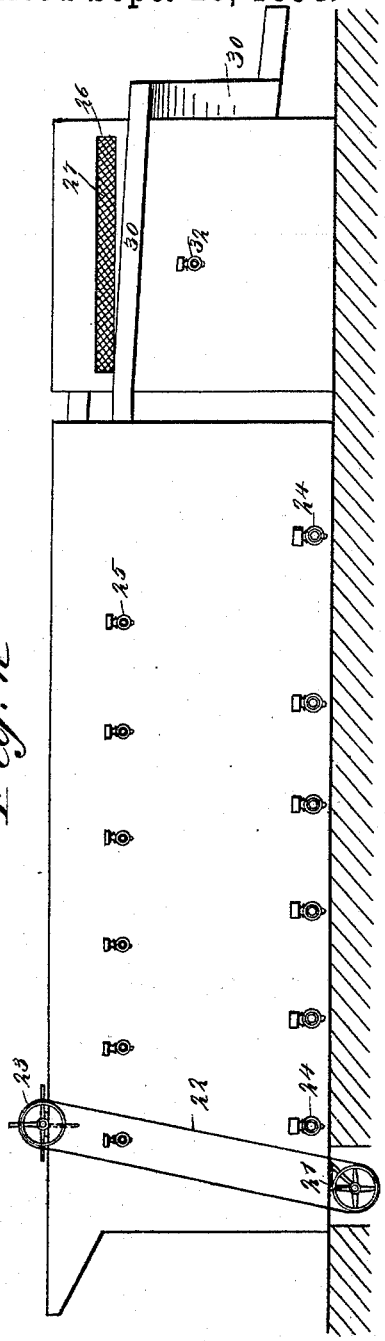
WITNESSES:
C. Neveux
C. Sedgwick
INVENTORS
D. W. Fall
F. B. Wineland
S. L. Richards
BY Munn & Co.
ATTORNEYS.

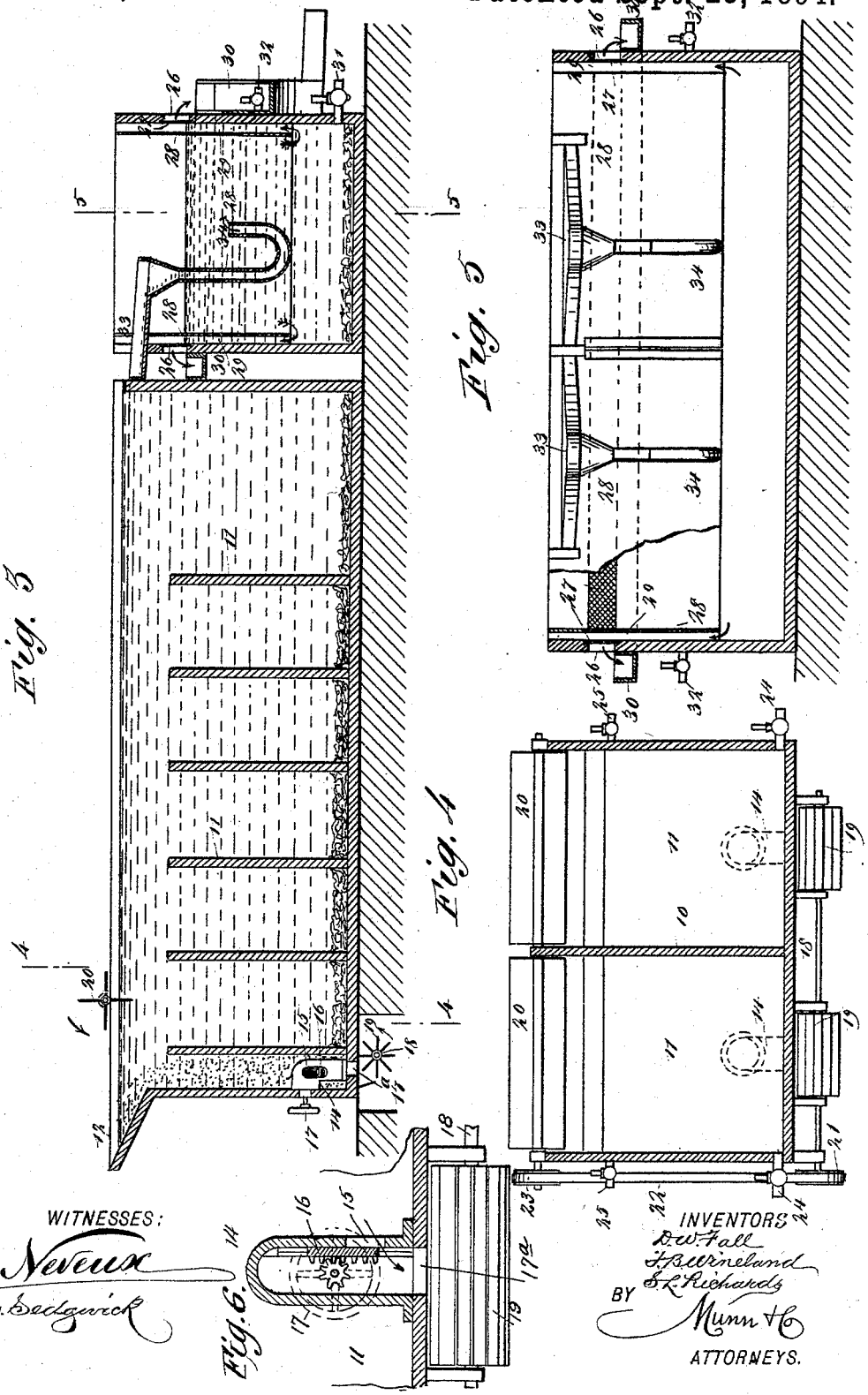

UNITED STATES PATENT OFFICE.

DANIEL W. FALL, FRANK B. WINELAND, AND SAMUEL L. RICHARDS, OF BRECKENRIDGE, COLORADO.

SETTLING-TANK.

SPECIFICATION forming part of Letters Patent No. 526,565, dated September 25, 1894.

Application filed June 23, 1893. Serial No. 478,578. (No model.)

*To all whom it may concern:*

Be it known that we, DANIEL W. FALL, FRANK B. WINELAND, and SAMUEL L. RICHARDS, of Breckenridge, in the county of Summit and State of Colorado, have invented a new and useful Improvement in Settling-Tanks, of which the following is a full, clear, and exact description.

Our invention relates to an apparatus used in the treatment of ore, and it has for its object to provide a settling tank for slimes, provided with partitions for classifying the slimes, and to provide the said settling tank also with an agitating fan or wheel which will create within the tank a regulated current, forcing the floating slimes to travel over all of the partitions and to one end of the tank.

A further object of the invention is to provide a valve in connection with the tank, by means of which the discharge of sand and water will be under the perfect control of the operator of the apparatus, the outgoing sand and water being utilized as a driving agent for the fan or wheel employed to induce the current.

A further object of the invention is to provide in connection with the settling tank a second tank adapted to receive the floating slimes from the settling tank, and to so construct the second tank, which may be designated the float tank, that the slimes will be delivered to it beneath the surface of the water, and those that have sufficient weight to sink will drop to the bottom, while those that will float will remain upon the surface of the water contained in the float tank.

A further object of the invention is to provide the float tank with an outlet or overflow chute so connected with the tank that it will be impossible for anything not a fluid to pass from the tank into it.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1 is a plan view of the two tanks, illustrating their relation one to the other. Fig. 2 is a side elevation of both of the tanks. Fig. 3 is a longitudinal vertical section through both tanks, the section being taken practically on the line 3—3 of Fig. 1. Fig. 4 is a transverse section taken through the settling tank, practically on the line 4—4 of Fig. 3. Fig. 5 is a transverse section taken through the float tank, essentially on the line 5—5 of Fig. 3, and Fig. 6 is an enlarged detail view of the valve 14.

We will first describe the construction of the settling tank. This tank may be given any desired shape. Preferably, however, it is somewhat rectangular in general contour and is divided into two compartments by means of a central longitudinal partition 10. Each of these two compartments constitutes in itself a tank, and both of them are of the same construction. Ordinarily only one of them need be brought into action, but both may be used at one and the same time if in practice it is found desirable.

The tank is provided with a series of transverse partitions 11, which extend from the bottom upward, and terminate a predetermined distance from the top of the tank, as shown in Fig. 3. These partitions may be placed any desired intervals apart. Preferably however, as shown in the drawings, the partitions are placed at regular intervals from each other; but the space between the forward end of the tank and the forward partition is usually made more contracted than the spaces between the partitions, and this forward space or compartment may be properly designated the sand compartment or receiving compartment, as it is adapted to receive the sand or pulverized ore containing the slimes to be extracted, while the space between the rear end of the tank and the rear partition 11 is much greater than that of any of the other compartments, as in this last compartment the lightest sinkable slimes settle.

At the upper free end of the tank a feed chute 12, is constructed, having a downward inclination and into which the sand for example is poured, and it directs the sand to the receiving compartment of the tank. Within the receiving compartment of the tank a valve 14, is located, the valve being in the bottom portion of the compartment, as shown best in Fig. 3. This valve is provided with one or more openings 15 in its side surfaces, and the said openings may be closed in any suitable or approved manner, for example by means of a slide or gate 16 operated from a stem 17 located upon the exterior of the tank the slide or gate being provided with a rack engaged by a pinion on the stem. The valve 14, is directly over an opening 17ª, produced in the bottom of the tank, and at one side of this opening below the tank a shaft 18, is journaled, carrying a water wheel 19 of any approved construction. This wheel is revolved by the sand and water which escape through the valve from the tank.

The wheel 19, is adapted to revolve a fan or bladed wheel 20, the shaft of which is journaled upon the top of the tank transversely thereof near the front portion; and the shaft of the water wheel is provided at one end with a pulley 21, which is connected by a belt 22 with a second pulley 23, located on the shaft of the upper wheel or fan.

Each compartment in a tank is provided at its bottom with a valved pipe 24, by means of which the slimes settling in that compartment may be drawn off; and each tank is further provided preferably above each compartment with a second set of valved pipes 25, and when desirable these pipes are adapted to draw off all of the water contained within the tank above the level of the partitions contained therein.

The float tank is located at the rear of the settling tank, and is of about the same depth. The float tank is provided at its back, front and sides with openings 26, preferably produced longitudinally therein, the said openings being located at proper intervals apart; or they may extend practically unbroken from end to end or from side to side. Each opening 26, is covered by a screen 27, made of wire or of fabric of any description, the screens being made quite fine. The screens are secured to the inner face of the tank, and each screen opening is covered by a shield 28. The shields extend from the top of the float tank downward some distance below the screens, preferably to about the central portion of the tank, as is best shown in Fig. 3; and the shields 28, while they are connected at their ends to the walls of the tank are projected inward from the screens, whereby a space or chamber 29, is formed between each shield, the screen opposite which it is located and the wall of the tank in front of which it is placed, as best shown in Fig. 3. The shield chambers 29, are open at both the top and the bottom. An offtake trough 30, is made to surround the float tank, the trough being so located as to receive the overflow of water which shall pass through the screen, and convey the said overflow to any desired point.

The float tank is provided with valved pipes 31 at its bottom designed to draw off the slimes that may settle therein; and a second set of valved pipes 32, is located above the plane of the lower edges of the shields, so that the water may be drawn off from the tank to about the level of the center of the tank.

Each settling tank in connection with which a float tank is employed, delivers its overflow and consequently its floating slimes to the float tank through the medium of a chute 33. The chute is located at the rear end of the settling tank, and where it joins with the settling tank is as wide as its outlet. The chute, however, is contracted at its outer end and is given somewhat of a downward inclination; and the chute at its outer end is connected with a pipe 34, which extends downward within the float tank preferably to about the center thereof; and the lower end of the delivery pipe 34, is curved in an upwardly direction while its upper end may be made somewhat funnel-shaped, as shown in Fig. 3, to facilitate its ready reception of the overflow from the settling tank. The discharge end of the delivery pipe 34 is carried upward some distance above the lower line of the shields, to about a foot below the surface of the water for example, to insure the slimes being delivered near the surface and to prevent any entering the chambers 29 and escaping through the screens.

In operation, water is supplied to the settling tank in sufficient quantities to keep it full and to provide for about one or two inches of overflow therefrom. The sand is delivered into the receiving chamber of the settling tank, and according to the opening in the valve 14 the sand and water together will pass more or less freely and in greater or less quantities through the valve and through the opening 17ª in the bottom of the tank, and acting upon the wheel 19, will revolve the same and cause the upper fan or wheel 20 to be revolved, and the latter wheel or fan will create a uniform current in the water contained in the tank, since the fan extends downward within the water, the current being in direction of the outlet end of the tank.

It will be understood that water will be delivered to the tank in proportion to the amount discharged therefrom and by means of the valve 14 the discharge is under the complete control of the operator. As the slimes are floated along by the current those of greatest weight will drop into the first compartment, or the one next to the sand-receiving compartment, and thus all the slimes will drop into each following compartment according to their weight and buoyancy, and the lightest sinkable slimes will settle in the last compartment in the tank, while the slimes too light to sink will be carried by the overflow from the settling tank to the chute 33, and will be delivered through its connected pipe 34 into the float tank near the level of the water and this tank is kept filled with water up to the lower line of the screens.

When the slimes enter the float tank those that are capable of sinking will fall to the bottom, as it is impossible for the slimes to escape from this tank, while those that are too light to sink even after remaining in the tank for some time, will float to the top and will remain there, since it is utterly impossible for the water to escape from the tank except through the chambers 29 at the back of the shields and out through the screens 27 and these screens will admit of the exit of nothing except that which is in a fluid state, and nothing else will be carried to them.

It will thus be observed that when tanks are constructed as above set forth, all of the slimes will be eventually recovered, as those that are capable of sinking will settle to the bottom while those that will float will be found collected upon the surface of the water in the float tank.

The device is not only simple in its construction but is capable of being readily manipulated, requiring but little attention. In fact, comparatively no attention is called for after the valve 14, has been set and the supply of water regulated. The tanks are also exceedingly durable and will perform efficient service.

Having thus described our invention, we claim as new and desire to secure by Letters Patent—

1. A slimer or slime settling tank, provided at one end with a feed chute and a sand compartment into which the heavy particles of sand or powdered ore are directed by said chute, the inner wall of said sand compartment being of less height than the water level in the tank and chute, a discharge valve located in said sand compartment and communicating with the exterior of the tank, and means for creating a uniform current in one direction, whereby the slimes contained in the sand or powdered ore are caused to float over the top of the inner wall of said compartment, substantially as specified.

2. In a slimer, or slime settling tank, a compartment arranged at one end of said tank and into which the sand or powdered ore delivered to the tank falls, the inner wall of said chamber being of less height than the water level in the tank, an agitating fan or wheel journaled in the upper portion of said tank and operated to create a current in one direction for the purpose specified, a discharge valve located in the said compartment, a wheel located beneath the discharge end of the valve, and a belt connection between the wheel and the agitating fan of the tank, whereby the discharge of the waste is utilized to drive the fan, substantially as set forth.

3. A slimer, or slime-settling tank, provided with a series of partitions dividing it into compartments, the partitions being of less height than the height of the tank, and an agitating wheel adapted to revolve in one direction and create a uniform current, the said wheel being located at the top of the tank near the foremost partition, and a driving mechanism for the wheel, as and for the purpose set forth.

4. In a slimer, or slime-settling tank, a receiving compartment provided with a discharge valve therein adapted for the discharge of sand and water, said valve having communication with the outside of the tank, a series of partitions located within the tank, of less height than the height of the tank, an agitating or current-creating fan journaled in the upper portion of the tank adjacent to the foremost partition, and a driving connection between the valve and the fan, substantially as shown and described.

5. In a slime-settling tank, a receiving compartment provided with a discharge valve having communication with the exterior of the tank, partitions located within the tank, of less height than that of the tank, valved discharge pipes connected with the tank near the upper ends of the partitions and likewise near their lower ends, a current-creating or agitating fan journaled in the upper portion of the tank and extending down within it, and a driving mechanism, substantially as shown and described, connected with the fan, as and for the purpose set forth.

6. The combination with a slimer, or slime settling tank, and a slime float tank, of an overflow duct connected with the settling tank and delivering into the float tank, the delivery end of the duct being located below the water line of the said float tank, outlet chambers connected with said float tank, the liquid entering said outlet chambers below the plane of the discharge end of the tube, and overflow openings leading from said chambers, substantially as set forth.

7. The combination with a slimer, or slime settling tank, and a slime float tank, of an overflow duct connected with the settling tank and extending downward within the float tank below the water line thereof, the lower end of the duct being upwardly curved and located also beneath the water line, overflow openings located in the walls of the float tank, establishing the water line, and guard plates connected with the inner walls of the tank and extending above the water line and below the plane of the said overflow openings and forming a series of outlet chambers, as and for the purpose set forth.

8. In a slime-float tank, a series of overflow openings adapted to establish a water line, screens stretched across said openings, guard plates connected with the inner walls of the tank and extending inward a distance from the screens and below the lower edges of the screens, forming a series of outlet chambers for liquid only, and a receiving tube suspended within the tank and extending above and below the water line thereof, the discharge end of the tube being higher than the lower edges of the guards, as set forth.

9. The combination with a slimer, or slime settling tank, and a slime float tank, of an overflow duct connected with the settling tank and delivering into the float tank, the delivery end of the duct being upwardly curved and located beneath the water line, overflow openings located in the walls of the float tank, screens covering said openings, guard plates connected with the inner walls of the tank and extending above the water line and below the plane of the overflow openings, and means for draining the fluid from the float tank arranged below the plane of the discharge end of the duct, substantially as shown and described.

DANIEL W. FALL.
    FRANK B. WINELAND.
    SAMUEL L. RICHARDS.

Witnesses:
 E. G. BARTLETT,
 ROBT. W. FOOTE.